United States Patent [19]

Kawaguchi et al.

[11] 4,401,347
[45] Aug. 30, 1983

[54] FLUID PRESSURE CONTROL VALVE FOR DUAL BRAKING SYSTEM

[75] Inventors: Hiroshi Kawaguchi, Mishima; Shuho Nishina, Susono, both of Japan

[73] Assignee: Toyota Jidosha Kogyo Kabushiki Kaisha, Toyota, Japan

[21] Appl. No.: 273,493

[22] Filed: Jun. 15, 1981

[30] Foreign Application Priority Data

Dec. 9, 1980 [JP] Japan .......................... 55-176561[U]
Dec. 27, 1980 [JP] Japan .......................... 55-191230[U]

[51] Int. Cl.³ .................................................. B60T 11/28
[52] U.S. Cl. ...................................... 303/6 C; 188/349
[58] Field of Search ............... 303/6 C, 6 R, 22 A, 303/22 R, 23 A, 23 R, 111, 6 A, 84 A, 84 R, 52; 188/195, 349, 345, 16, 354

[56] References Cited

U.S. PATENT DOCUMENTS

| | | | |
|---|---|---|---|
| 3,459,226 | 8/1969 | Schultz | 303/52 X |
| 3,982,795 | 9/1976 | Grüner | 303/52 |
| 4,101,176 | 7/1978 | Carré et al. | 188/195 X |
| 4,199,196 | 4/1980 | Teluo | 303/22 R X |
| 4,203,627 | 5/1980 | Kono | 303/22 R |
| 4,274,681 | 6/1981 | Tsuda et al. | 303/6 C |
| 4,278,299 | 7/1981 | Tsuda et al. | 188/349 X |
| 4,299,426 | 11/1981 | Hales et al. | 303/22 R X |
| 4,350,395 | 9/1982 | Lüpertz | 303/6 C |

FOREIGN PATENT DOCUMENTS

| | | |
|---|---|---|
| 2748699 | 5/1978 | Fed. Rep. of Germany . |
| 1444397 | 7/1976 | United Kingdom ........... 303/22 R |
| 1531803 | 11/1978 | United Kingdom . |
| 2008216 | 5/1979 | United Kingdom ........... 303/6 C |
| 1557051 | 12/1979 | United Kingdom . |
| 2041474 | 9/1980 | United Kingdom . |
| 2048408 | 12/1980 | United Kingdom . |

Primary Examiner—Douglas C. Butler
Attorney, Agent, or Firm—Parkhurst & Oliff

[57] ABSTRACT

A braking fluid pressure control apparatus for a dual circuit type vehicle brake system. The control apparatus is provided with a pair of pressure reducing or pressure limiting valve plungers disposed in a housing parallelly one another, with respective rear ends being protruded out of the housing, and a biasing device for commonly biasing both rear ends into the housing. The biasing device includes a guide rod pivoted to the housing at an intermediate position of the pair of valve plungers oscillatably in a parallel direction to a plane including the axes of both plungers. On the guide rod a transmitting member having an operating portion abuttable to the rear ends of both plungers is slidably fitted and biased by a spring toward the rear ends of the plungers. The guide rod limits the oscillation in a minute angle range, with a result that when a pressure failure has occurred in one circuit the valve plunger influenced by the pressure of the other circuit is obliged to singly resist the biasing force of the spring so as to start pressure reducing or limiting operation at a higher pressure level than in normal condition.

15 Claims, 5 Drawing Figures

FLUID PRESSURE CONTROL VALVE FOR DUAL BRAKING SYSTEM

BACKGROUND OF THE INVENTION

This invention relates to a fluid pressure control apparatus including a pair of fluid pressure limiting valves or fluid pressure reducing valves to be used in a brake system of dual-circuit type wherein braking fluid pressure produced in a master cylinder is transmitted through a pair of mutually independent piping circuits to each of the rear wheels, right and left.

A fluid pressure control apparatus in which a pair of valve plungers are disposed parallel to each other in one housing with respective rear end protruding out of the housing and share one biasing device to be biased into the housing is already known by the United Kingdom patent specifications Nos. 1,531,803; 1,557,051; etc.

Parallel plunger type control apparatuses of this kind are all defective in being too complicated in the structure of the biasing device, lacking operational stability, or producing strange noise or getting rid of some parts when the valve is forcibly vibrated as a whole. They have been anyway far from being fully satisfactory.

SUMMARY OF THE INVENTION

It is therefore a primary object of this invention to provide a parallel plunger type control apparatus provided with an excellent biasing device in respective of being easy to manufacture, stable in operation, and stabilized as a whole even in a forcible vibration time.

According to the present invention there is provided a braking fluid pressure control apparatus including a pair of valve plungers disposed in parallel in one housing with respective rear end protruding out of the housing and means for biasing the rear ends into the housing, for controlling the braking fluid pressure produced in a master cylinder to be transmitted to each wheel brake disposed on a left rear wheel and a right rear wheel of a vehicle via two independent piping circuits; and the pressure control apparatus is characterized in that the biasing means comprises a guide rod retained at an intermediate position of the pair of valve plungers by a pivot pin oscillatably in a parallel direction to a plane including the axes of both plungers, a transmitting member provided with a tubular portion slidably fitted on the guide rod and an operating portion abuttable to the rear ends of the valve plungers, a spring for constantly imparting a predetermined biasing force to the rear ends of the valve plungers, and stopping means for limiting oscillation of the guide rod to an angular range having the center thereof on a straight line passing the axis of the pivot pin and parallel to the axes of the valve plungers, and that when pressure failure occurs in one of the independent piping circuits one of the valve plungers corresponding to a normal circuit executes pressure controlling operation thereof singly resisting the biasing force of the spring for moving the transmitting member along the guide rod which is stopped at one end of the angular range by the stopping means.

By taking such a design the guide rod may be attached simply with a pivot pin to the housing or a member secured thereto, and the transmitting member also may be slidably fitted on a guide rod of a rod shape. It allows the manufacturing of the apparatus to be quite easy and operation of the apparatus to be stable. Another merit of this invention resides in effective prevention of rattling in the fluid pressure control apparatus even when it is forcibly vibrated, because the fitting clearance between the pivot pin and the guide rod as well as between the guide rod and the transmitting member can be minimized in this invention.

DETAILED DESCRIPTION OF THE PREFERRED EMBODIMENTS

Figure 1:
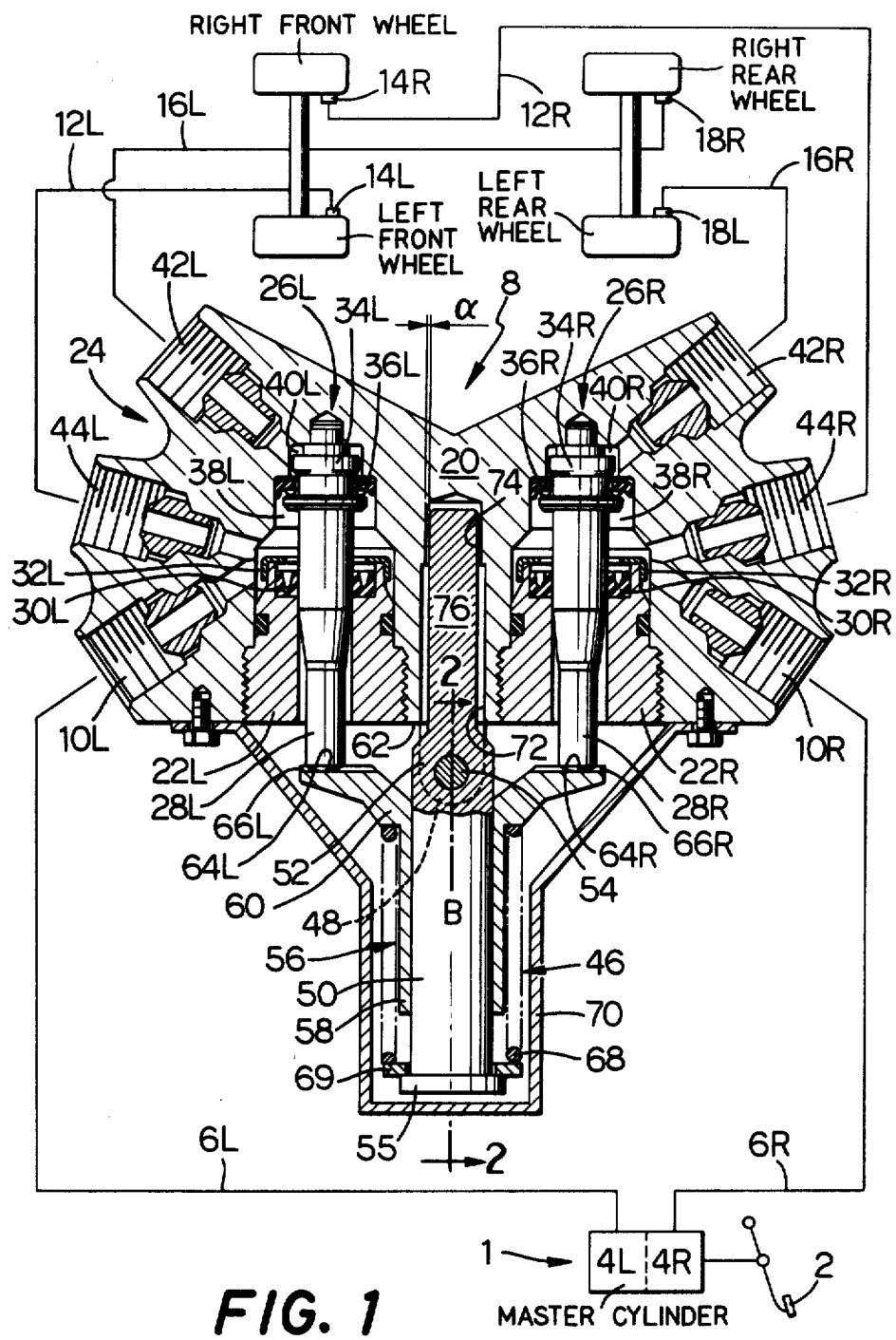
FIG. 1 is an elevational sectional view of an embodiment of a fluid pressure control apparatus in accordance with the invention.

In a master cylinder 1 in FIG. 1, an equal amount of fluid pressure is generated in each of a first pressure producing chamber 4L and a second pressure producing chamber 4R in response to depressing of a brake pedal 2. The chamber 4L is connected via a conduit 6L to an inlet port 10L of a fluid pressure control apparatus 8, and further connected via a conduit 12L to a wheel cylinder 14L on a left front wheel and at the same time to a wheel cylinder 18R on a right rear wheel through a conduit 16L. The second pressure producing chamber 4R is in a similar way communicated via a conduit 6R to an inlet port 10R, and further via conduits 12R and 16R respectively to each wheel cylinder 14R, 18L on a right front wheel and a left rear wheel.

The fluid pressure control apparatus 8 includes a pair of pressure reducing valves 26L, 26R sharing a housing 24 which consists of a main housing 20 and a pair of cylindrical members 22L, 22R. As the both pressure reducing valves 26L, 26R are of the entirely same structure, description will be limited only to one valve 26L, the other valve 26R being omitted of explanation by replacing the sign L by R in reference signs. In an opening of a blind hole formed in the main housing 20 the cylindrical member 22L is fixed by being screwed thereinto, and in a hollow portion of the cylindrical member 22L a valve plunger 28L is pierced through. At the upper part of the cylindrical member 22L a seal member 30L is fitted into, which is covered in turn by a seal cover 32L. One end of the valve plunger 28L is formed into a valve 34L, adjacent to which a valve seat 36L is disposed.

The inlet port 10L formed in the main housing 20 for being connected with the conduit 6L is, through an inlet chamber 38L and an outlet chamber 40L disposed on either side of the valve seat 36L, communicated to an outlet port 42L for a rear wheel brake. And the inlet port 10L is also only by way of the inlet chamber 38L communicated to an outlet port 44L for a front wheel brake. Those three ports 10L, 44L, and 42L are arranged almost radially assuming their center at the inlet chamber 38L, which makes the piping arrangement of the conduits connected to them quite easy, and the main housing 20 results in simultaneously functioning by the three ports 10L, 44L and 42L as a T-shape joint for diverging or branching off the conduits.

Figure 2:
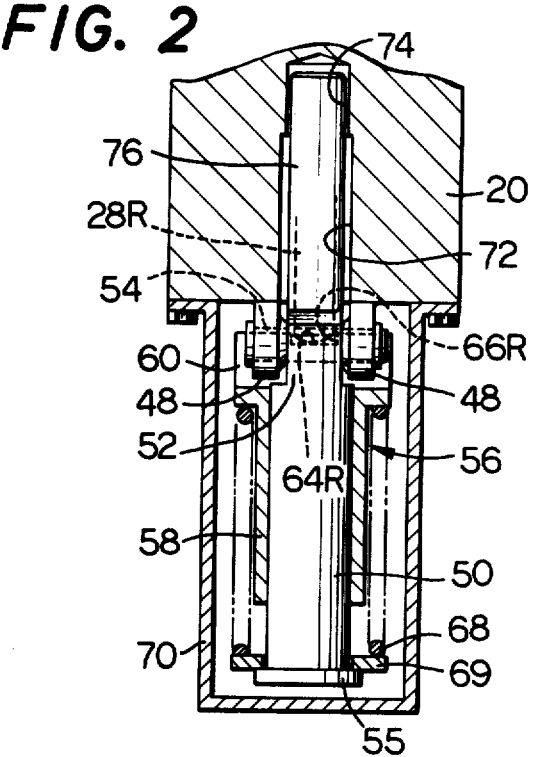
FIG. 2 is a profile in section of an essential part of the embodiment in FIG. 1.

The biasing device 46 will be described next. At the central portion of the bottom of the main housing 20 a pair of plate-like support pieces 48, as can be seen in FIG. 2, are formed intermediately between the two valve plungers 28L, 28R in a downward and mutually parallel posture. To those support pieces 48 a head 52 of a guide rod 50 of round rod shape is rotatably connected with a pivot pin 54 in a parallel direction to a plane including the axes of the valve plungers 28L, 28R. The head 52 of the guide rod 50 is provided with a pair of planes formed perpendicular to the pivot pin 54 by a so-called method of taking two valid surfaces, the width from one plane to the other is so determined as to be just fitted between the pair of support pieces 48. On the end of the guide rod 50 opposite from the head 52 a flange 55 is formed.

On the guide rod 50 the transmitting member 56 is slidably fitted in the axial direction of the guide rod 50. The transmitting member 56 is provided with a cylindrical portion 58 fitted on the guide rod 50 and an operating portion 60 applying force on both valve plungers 28L, 28R. The operating portion 60 is slantwise extended from one end of the cylindrical portion 58 on the side of the housing 24 along a plane including a central line of the cylindrical portion 58 toward the end of both valve plungers 28L, 28R, so as to become a pair of arms. On the upper surface of both ends of the operating portion 60 a pair of abutting surfaces 64L, 64R are formed parallelly faced to the lower surface of the housing 24 and to respectively abut on the end of the valve plungers 28L, 28R. Both abutting surfaces 64L, 64R respectively form a bottom surface of a pair of grooves 66L, 66R of rectangular shape in section which are longitudinally formed open upwards on the upper surface of either end of the operating portion 60. Into those grooves 66L, 66R the end of both valve plungers 28L, 28R is respectively fitted for preventing the transmitting member 56 from rotating about the guide rod 50.

Between the transmitting member 56 and the guide rod 50 a compression coil spring 68 is disposed with a predetermined load, which being at one end thereof urged on a spring seat such as a washer 69 supported by the flange 55 of the guide rod 50 and at the other end on the operating portion 60 of the transmitting member 56. The valve plungers 28L, 28R are biased to a non-operating direction by the resilient force from the spring 68 which comes through the abutting surfaces 64L, 64R of the operating portion 60.

The whole biasing device 46 is completely protected by a cover 70 secured to the main housing 20 with bolts.

In the lower surface 62 of the main housing 20 a stopper hole 72 is open rightly intermediate position between the axes of both valve plungers 28L, 28R. This stopper hole 72 is deeply formed in the main housing 20 parallel to the valve plungers 28L, 28R. And the deepest portion thereof is made into a slightly diameter decreased portion, which is processed on the inner peripheral surface to a high degree precision to become a stopper surface 74.

From the head 52 of the guide rod 50 where the same is supported by the pivot pin 54 extends a stopper projection 76. It is a rod like member coaxially made with the guide rod 50 with a slightly smaller diameter than that of the guide rod 50. The stopper projection 76 is fitted into the stopper hole 72 formed in the main housing 20, and the peripheral portion of the end thereof is faced to the stopper surface 74 with an exact clearance $\alpha$ kept therebetween. This clearance $\alpha$ is relatively easy to exactly form and keep, because there arises little accumulation of manufacturing errors due to the easy forming of the stopper hole 72 and the stopper projection 76, and the integral processing of the stopper projection 76 with the guide rod 50. A further advantage of the invention is that formation of the stopper hole 72 in the housing 24 contributes to reducing the weight of the apparatus.

The guide rod 50 is oscillatably or swingably attached with the pivot pin 54 to the main housing 20, and the transmitting member 56 is slidably fitted on the guide rod 50, which allows the transmitting member 56 to similarly make oscillation movement about the pivot pin 54. And the oscillation movement is limited within a minute angular range having its center on a straight line B which passes the axis of the pivot pin 54 and parallel to the valve plungers 28L, 28R. It is inevitable in this oscillation movement of the transmitting member 56 that the operating portion 60 is slightly moved in a perpendicular direction to the axes of the valve plungers 28L, 28R, so positioning of the pivot pin 54 as closely as possible to a straight line linking the tips of the valve plungers 28L, 28R is desirable.

Operation of the fluid pressure control apparatus 8 in a dual circuit type brake system will be explained, assuming two cases wherein both circuits are in normal condition (hereinafter called normal time) on one hand and either one circuit is hit by a failure (hereinafter called one circuit damaged time) on the other hand.

In a normal time depressing of the brake pedal 2 produces in both of the first pressure producing changer 4L and the second pressure producing chamber 4R of the master cylinder 1 an equal braking fluid pressure. The fluid pressure produced in the first pressure producing chamber 4L is transmitted to the inlet port 10L via the conduit 6L, which pressure is further transmitted on one hand through the outlet port 44L and the conduit 12L to the wheel cylinder 14L on the left front wheel and on the other hand through the pressure reducing valve 26L on the left side, the outlet port 42L, and the conduit 16L to the wheel cylinder 18R on the right rear wheel. The fluid pressure produced in the second pressure producing chamber 4R is similarly transmitted to the respective wheel cylinder 14R, 18L on the right front and left rear wheels.

Further strong depressing applied on the brake pedal 2 to an extent so as to cause the fluid pressure in both pressure producing chambers 4L, 4R to exceed a predetermined value makes the pressure reducing valves 26L, 26R begin to operate. In other words, a great fluid pressure is transmitted to the wheel cylinders on the front wheels unchanged as it is while a reduced fluid pressure in both pressure reducing valves 26L, 26R is transmitted to the wheel cylinders on the rear wheels.

When the fluid pressure in each outlet chamber 40L, 40R of the pair of pressure reducing valves 26L, 26R exceeds a predetermined value, both valve plungers 28L, 28R urge downwards, against the biasing force of the compression coil spring 68, the transmitting member 56 to straight linearly move along the guide rod 50, followed by seating of the valves 34L, 34R on each of the valve seats 36L, 36R. After this seating both valve plungers 28L, 28R minutely move by inching until the force applied by the braking fluid pressure on the valve plungers 28L, 28R and the biasing force of the compression coil spring 68 are equilibrated so as to perform the well known fluid pressure reducing operation.

The operation stroke, a movement amount, of both valve plungers 28L, 28R should be primarily equal to each other, but a minute difference may arise between the two due to an error in manufacturing or another. This possible difference can be absorbed by a slight inclination of the transmitting member 56 made along with the guide rod 50.

For example, when the right side valve 34R can not be perfectly seated on the valve seat 36R while the left side valve 34L is tightly seated on the valve seat 36L, the fluid pressure in the outlet chamber 40R becomes slightly higher than that in the outlet chamber 40L to cause the transmitting member 56 abutted on the end of both valve plungers 28L, 28R to be slightly inclined or rotated clockwise (in FIG. 1) along with the guide rod 50 about the pivot pin 54. The valves of both valve plungers can be in this way perfectly seated on each valve seat.

In the normal time when both circuits are in a normal working condition, an oscillation of the guide rod 50 can not cause the stopper projection 76 to abut on the stopper surface 74 of the stopper hole 72, because the clearance or gap α between the two is so determined as to allow the stroke difference between the valve plungers 28L and 28R.

Operation in the one circuit damaged time will be described next.

When, for example, oil leakage has happened in the conduit 6L the fluid pressure is not transmitted to the inlet port 10L, and it will naturally not be transmitted to the proportioning valve 26L, and the wheel cylinders 14L and 18R. On the contrary, the inlet port 10R will be supplied with the fluid pressure, and the pressure reducing valve 26R and the wheel cylinders 14R, 18L will also be under the influence of the pressure.

When therefore the fluid pressure in the outlet chamber 40R exceeds the predetermined value for the normal time the valve plunger 28R begins to move in a direction wherein the valve 34R is going to seat on the valve seat 36R. The transmitting member 56 which is urged at one abutting surface 64R thereof by the valve plunger 28R is gradually inclined, with the other abutting surface 64L being in an abutted condition on the end of the valve plunger 28L, so as to compress the compression coil spring 68. Further advancing of the inclination of the transmitting member 56 will cause the peripheral portion of the end of the stopper projection 76 to be abutted on the stopper surface 74 of the stopper hole 72 to prevent the guide rod 50 to be further inclined. At this stage the valve plunger 28R is not seated on the valve seat 36R yet.

Further rising of the fluid pressure in the outlet chamber 40R causes the valve plunger 28R to urge the transmitting member 56 more strongly so that the same may slide downwards on the guide rod 50 which has been prevented from inclination owing to the abutment of the stopper projection 76 on the stopper surface 74. At this time one abutting surface 64L of the transmitting member 56 is separated away from the end of the valve plunger 28L.

Upon arriving at this condition the valve 34R of the valve plunger 28R is seated on the valve seat 36R.

Since the valve plunger 28R in the one circuit damaged time is singly confronted to the biasing force of the spring 68, the transmitting member 56 which has been prevented from inclination by the abutment of the stopper projection 76 on the stopper surface 74 is not moved downwards unless fluid pressure two times as large as in the normal time is applied on the valve plunger 28R. In other words, the pressure reducing valve 26R does not begin the fluid pressure reducing operation before the fluid pressure in the outlet chamber 40R is approximately doubled. It means that the wheel cylinder 18L on the left rear wheel receives a far higher braking fluid pressure in comparison to the normal time.

By the way, the stopper projection 76 and the stopper hole 72 are not necessarily required to be coaxially formed with the guide rod 50. They may be formed in a deviated status from the axis of the guide rod 50, so long as they are so located as to cross the axis of the pivot pin 54. Besides, formation of the stopper surface 74 by pressfitting of a ring into the stopper hole 72, or fitting of a ring on the end portion of the stopper projection 76 will make the exact determination of the clearance between the stopper projection 76 and the stopper surface quite easy, because highly precise processing or machining of either external periphery or internal periphery of the ring will suffice the condition. The stopper projection 76 may not necessarily be integrally made with the guide rod 50, but a separately made one is allowed to be threaded on (or in) the guide rod 50.

The guide rod 50 is not limited to a round rod shape, but it may be of prism shape if the cylindrical portion of the transmitting member 56 is reformed to a corresponding shape thereto. Formation of a rib(s) or groove(s) longitudinally formed on the guide rod 50 accompanied by the formation of supplementing groove(s) or rib(s) on the transmitting member 56 for mutual engagement will be helpful in regulating the relative rotation between the two, with a by-merit of eliminating the formation of the grooves 66L, 66R on the transmitting member 56.

Figure 3:
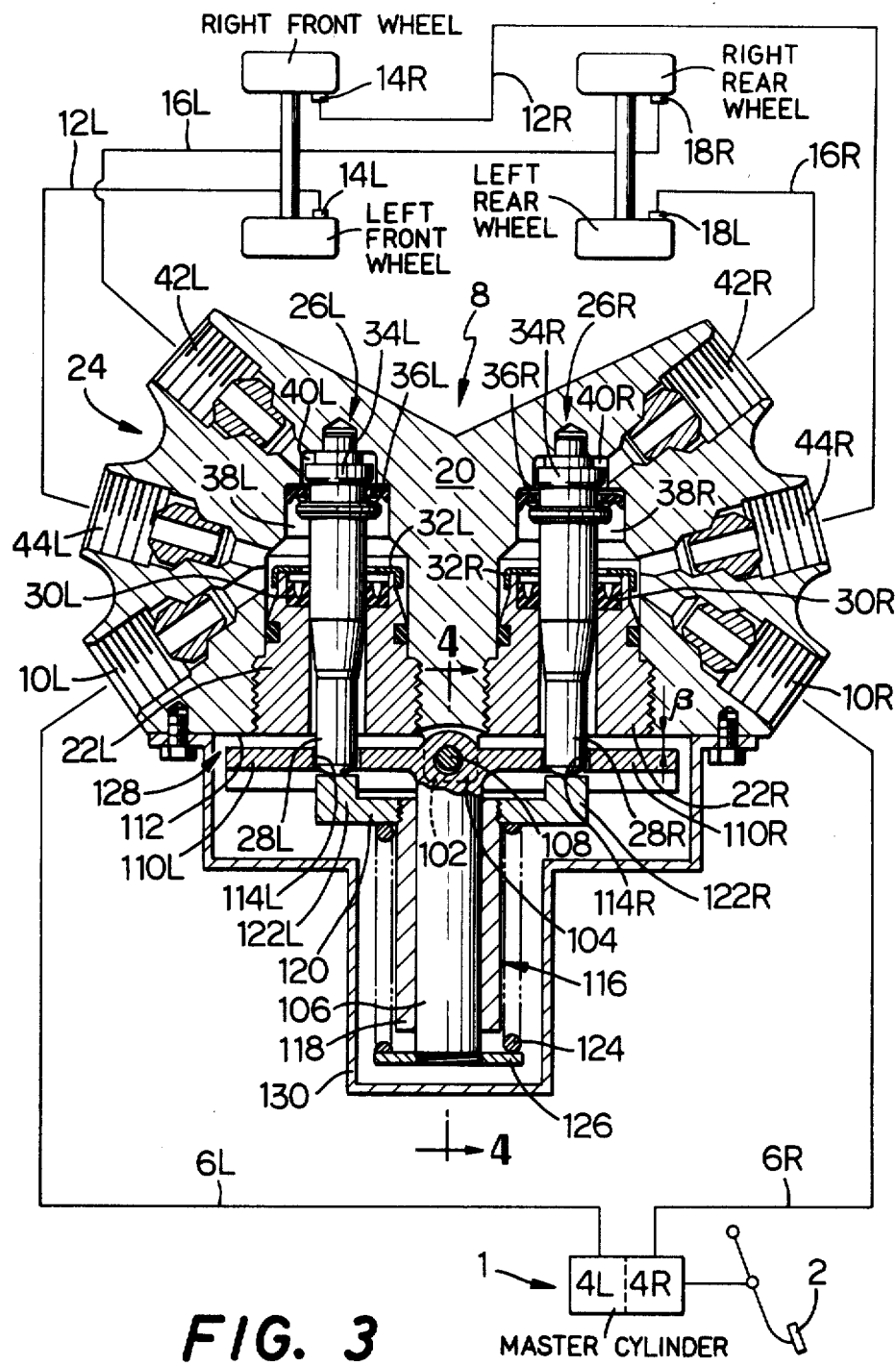
FIG. 3 is an elevational sectional view of another embodiment of a fluid pressure control apparatus in accordance with the invention.

Another embodiment of this invention will be described hereunder with reference to FIGS. 3 and 4.

Principal differences between the present embodiment and the previous one resides in the mode of structure and function of a biasing device 100 for biasing a pair of valve plungers 28L, 28R. So the biasing device 100 alone will be described in detail, omitting the explanation of other portions only by allotting the same signs to the same portions as in the previous embodiment.

Figure 4:
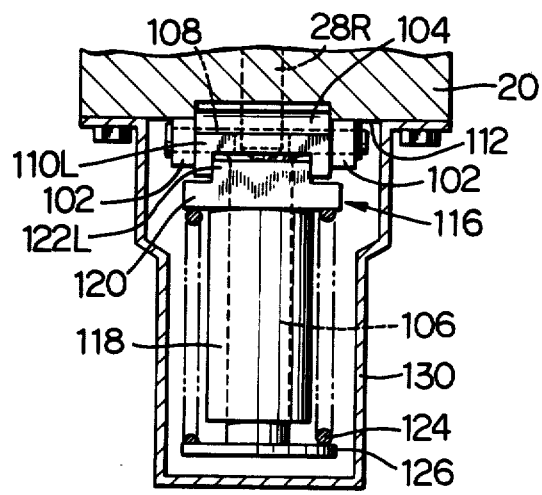
FIG. 4 is a profile in section of an essential part of the embodiment in FIG. 4.

At the central portion of the bottom of a main housing 20 a pair of plate-like support pieces 102, as can be seen in FIG. 4, are formed intermediately between two valve plungers 28L, 28R in a downward and mutually parallel posture. To those support pieces 102 a head 104 of a guide rod 106 of round shape is rotatably connected with a pivot pin 108 in a parallel direction to a plane including the axes of the valve plungers 28L, 28R. The head 104 of the guide rod 106 has a just fittable width between the pair of support pieces 102, and a pair of arms 110L, 110R extend in opposite direction one another therefrom, as shown in FIG. 3, in a perpendicular direction to the guide rod 106. The arms 110L, 110R each having a groove of rectangular shape in section on the lower surface thereof extend along the lower or bottom surface 112 of the main housing 20 so as to be spaced at the extreme end thereof from the lower surface 112 with an exact predetermined gap or distance β between the two. In each of the arms 110L, 110R a pair of through holes 114L, 114R are formed respectively coaxially with the axes of the pair of valve plungers 28L, 28R which are parallel to each other. The end of those plungers is respectively piercing through those holes 114L, 114R so as to slightly project out of the lower surface of the arms 110L, 110R. The arms 110L, 110R and the guide rod 106 are integrally formed in this embodiment, which however may be separately formed.

On the guide rod 106 a transmitting member 116, consisting of a cylindrical portion 118 and an operating portion 120 threaded on the former at one end thereof, is axially slidably fitted. The operating portion 120 which is a plate-like member parallel to the lower surface 112 of the main housing 20 is provided on either end thereof with an upwardly erected projection 122L, 122R, which are respectively fitted into the grooves on the arms 110L, 110R for preventing the transmitting member 116 from being rotated about the guide rod 106 and being urged by the biasing force of a compression coil spring 124 onto the end of the valve plungers 28L, 28R. This compression coil spring 124 is mounted with a predetermined preload between the operating portion 120 of the transmitting member 116 and a ring 126 threaded on the end of the guide rod 106.

As detailed in the above, the transmitting member 116, slidably fitted on the guide rod 106 which is rotatably connected to the main housing 20 with the pivot pin 108, is also rotatable about the pivot pin 108. This rotational movement or oscillation is limited to a minute or extremely small angular range, by virtue of a stopper mechanism 128 composed of the arms 110L, 110R and the lower surface 112 of the main housing 20 which are faced to each other having the exact gap $\beta$ therebetween, having its center on a straight line parallel to the axes of the valve plungers 28L, 28R. Incidentally, the operating portion 120 is inevitably moved a little bit when the transmitting member 116 makes the rotational movement in a perpendicular direction to the axes of the valve plungers 28L, 28R, so the pivot pin 108 is desirable to be positioned for minimizing the movement amount of the operating portion 120 close to a straight line connecting the tip of the valve plungers 28L, 28R to the greatest possible extent.

The biasing device 100 built as mentioned above is perfectly protected by a cover 130 secured to the main housing 20 with bolts.

Operation of the apparatus in this embodiment is substantially similar to that in the previous embodiment, requiring no further explanation.

Incidentally, the stopper mechanism 128 projections formed toward the housing on the arms 110L, 110R may be faced to projections formed on the housing 24 so as to abut each other. The projections on the arms may be the bolts erected by screwing on the arms 110L, 110R.

When attaching the guide rod 106 to the housing, either of forming of an attaching portion integrally with the housing 24 or securing of a bracket to the housing 24 for attaching the guide rod 106 thereto is permissible.

Figure 5:
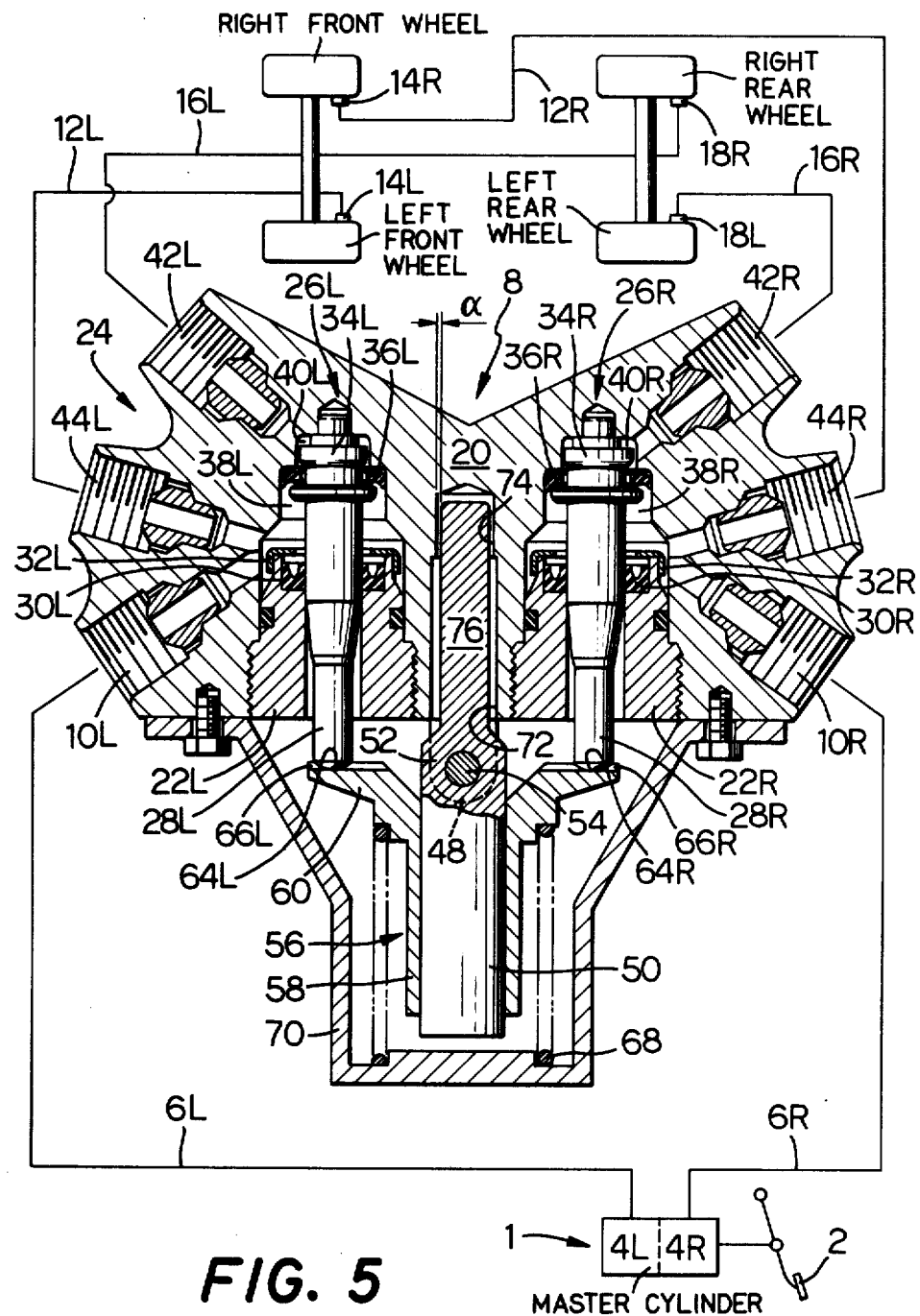
FIG. 5 is a elevational sectional view of another embodiment of a fluid pressure control apparatus in accordance with the invention.

Another embodiment of this invention is illustrated in FIG. 5, wherein a compression coil spring 68 is set between a transmitting member 66 and a cover 70. Except the above-mentioned description of the coil spring 68, there are no differences between this embodiment and that shown in FIGS. 1 and 2, all of the similar members being therefore allotted the same signs and numerals for omitting the superfluous explanation. The resilient force of the spring 68 being not applied on a pivot pin 54 in this embodiment, the size of the pivot pin 54 and support pieces 48 may be reduced and the distance between a pair of valve plungers 28L, 28R may be narrowed, which enables the apparatus to be made compact as a whole. And a guide rod 50 can be lightly oscillable because of smallness of the friction force produced between the guide rod 50 and the pivot pin 54, which advantageously makes the difference of the initial pressures in a pair of pressure reducing valves 26L, 26R where the pressure reducing operation is started.

The above description is concerned to an example where this invention is applied to a pressure reducing valve, but this invention is also applicable to a pressure limiting valve.

This invention is not limited to the above described embodiment, but it can be practiced in any suitably modified or improved styles according to the knowledge of those skilled in the art.

What is claimed is:

1. A braking fluid pressure control apparatus, including (1) a pair of valve plungers disposed in parallel in one housing with rear ends thereof protruding out of said housing, and (2) means for biasing the rear ends into said housing, for controlling the braking fluid pressure produced in a master cylinder to be transmitted to each wheel brake disposed on a left rear wheel and a right rear wheel of a vehicle via two independent piping circuits, said biasing means comprises (a) a guide rod retained at a middle position between said pair of valve plungers by a pivot pin oscillatably in a pivot plane parallel to a plane including the axes of both plungers, (b) a transmitting member provided with a tubular portion slidably fitted on said guide rod and an operating portion abuttable on the rear ends of said valve plungers, said tubular portion engaging said guide rod over a distance sufficient for preventing movements of said transmitting member relative to said guide rod other than sliding of the former along the latter and rotation of the former about the latter, (c) a spring for constantly imparting a predetermined biasing force to the rear ends of said valve plungers, and (d) stopping means for limiting oscillation of said guide rod in said pivot plane to within a predetermined angular range as measured from a straight line passing through the axis of said pivot pin and parallel to the axes of said valve plungers, and when pressure failure occurs in one of said independent piping circuits one of said valve plungers corresponding to a normal circuit executes pressure controlling operation thereof while singly resisting the biasing force of said spring for slidably moving said transmitting member along said guide rod whose oscillation is stopped at one end of said angular range by said stopping means.

2. A braking fluid pressure control apparatus as claimed in claim 1, characterized in that said stopping means comprises a stopper projection extending from one end of said guide rod where the same is carried by said pivot pin toward said housing and a stopper hole extended parallel to said valve plungers, said stopper projection being fitted into said stopper hole with a predetermined clearance therebetween so as to limit the oscillation of said guide rod.

3. A braking fluid pressure control apparatus as claimed in claim 1, characterized in that said stopping means includes a pair of arms extending in opposite directions from one end of said guide rod at which the guide rod is supported by said pivot pin, end portions of said pair of arms being spaced from a surface of said housing with a predetermined gap therebetween so as to limit the oscillation of said guide rod.

4. A braking fluid pressure control apparatus as claimed in claim 3, characterized in that said each arm is provided with a hole through which said rear end of a respective one of said valve plungers extends to abut on said operating portion of said transmitting member.

5. A braking fluid pressure control apparatus as claimed in claim 3, characterized in that said guide rod is round in section, said tubular portion of said transmitting member is of cylindrical shape, said each arm is provided with a groove in a surface thereof facing said operating portion, and said operating portion is provided with projections each fitting into said groove of said each arm for preventing said transmitting member from rotating about said guide rod.

6. A braking fluid pressure control apparatus as claimed in claim 1, characterized in that said guide rod is round in section and said tubular portion of said transmitting member is of cylindrical shape.

7. A braking fluid pressure control apparatus as claimed in claim 6, characterized in that said operating portion is provided with at least one groove into which said rear end of one of said valve plungers is fitted for preventing said transmitting member from rotating about said guide rod.

8. A braking fluid pressure control apparatus as claimed in claim 1, characterized in that said pivot pin is supported by a pair of support pieces disposed on said housing and a head of said guide rod is fitted between said pair of support pieces in such a state as to be prevented from moving along the axis of said pivot pin.

9. A braking fluid pressure control apparatus as claimed in claim 1, characterized in that said spring is set with a preload between said transmitting member and a spring seat disposed on said guide rod.

10. A braking fluid pressure control apparatus as claimed in claim 1, characterized in that said spring is set with a preload between said transmitting member and a member fixed on said housing.

11. A braking fluid pressure control apparatus as claimed in claim 10, characterized in that said member fixed on said housing is a cover for covering said biasing means.

12. A braking fluid pressure control apparatus as claimed in claim 10, characterized in that said valve plungers are for pressure reducing valves.

13. A braking fluid pressure control apparatus as claimed in claim 1, wherein said pivot pin is disposed substantially on a straight line passing through said rear ends of the valve plungers.

14. A braking fluid pressure control apparatus, including (1) a pair of valve plungers disposed in parallel in one housing with rear ends thereof protruding out of said housing, and (2) means for biasing the rear ends into said housing, for controlling the braking fluid pressure produced in a master cylinder to be transmitted to each wheel brake disposed on a left rear wheel and a right rear wheel of a vehicle via two independent piping circuits, said biasing means comprises (a) a guide rod retained at a middle position between said pair of valve plungers by a pivot pin oscillatably in a pivot plane parallel to a plane including the axes of both plungers, (b) a transmitting member provided with a tubular portion slidably fitted on said guide rod and an operating portion abuttable on the rear ends of said valve plungers, said tubular portion engaging said guide rod over a distance sufficient for preventing movements of said transmitting member relative to said guide rod other than sliding of the former along the latter, (c) a spring for constantly imparting a predetermined biasing force to the rear ends of said valve plungers, and (d) stopping means for limiting oscillation of said guide rod in said pivot plane to within a predetermined angular range as measured from a straight line passing through the axis of said pivot pin and parallel to the axes of said valve plungers, and when pressure failure occurs in one of said independent piping circuits one of said valve plungers corresponding to a normal circuit executes pressure controlling operation thereof while singly resisting the biasing force of said spring for slidably moving said transmitting member along said guide rod whose oscillation is stopped at one end of said angular range by said stopping means.

15. A braking fluid pressure control apparatus as claimed in claim 14, wherein said spring is set with a preload between said transmitting member and a spring seat disposed on said guide rod.

* * * * *